United States Patent Office 2,834,651
Patented May 13, 1958

2,834,651

PROCESS FOR THE PRODUCTION OF BORON CARBIDE

Edgar Garry Gray, Longford, England

No Drawing. Application May 21, 1953
Serial No. 356,599

9 Claims. (Cl. 23—208)

This invention relates to the production of boron carbide powders.

Various methods may be employed for the production of boron carbide powders. Generally these methods necessitate the employment of very high temperatures and yield a melted product which has to be subsequently submitted to laborious crushing and grading operations. For example, one known method consists in reacting pure boric anhydride and petroleum coke at a temperature of about 2400° C., which is substantially the melting point of boron carbide, with the formation around the carbon resistor of the furnace of an ingot of boron carbide, which has to be separated from the rest of the unreacted mass, crushed and graded. The product obtained is generally contaminated with uncombined carbon, whose absorption by the melted carbide at these temperatures is almost unavoidable.

According to the present invention there is provided a process for the production of boron carbide powders, including the steps of heating a charge containing carbon, calcined boric acid (boric oxide, $B_2O_3$) or a salt thereof, and magnesium or magnesium alloy at a temperature below the melting point of boron carbide to promote formation of boron carbide and subsequently separating the produced boron carbide by a leaching treatment.

The boron carbide powders produced by the process of the invention are substantially homogeneous and the particle size of the powders is determined by the temperature of reaction, increasing temperatures leading to increased particle sizes.

The measured temperature of reaction which is preferably below 2000° C., is that of the outside of the containers in which the charge is placed, and is measured with, for example, an optical pyrometer.

The preferred salts of boric acid are alkali-metal tetra-borates, such as dehydrated borax (anhydrous sodium tetra-borate, $Na_2B_4O_7$) or alkaline earth metal tetra-borates, but meta-borates may also be used.

The reaction is carrried out at a temperature well below the melting point of boron carbide. For example, the charge may be heated to substantially 930° C., at which temperature the reaction starts and evolves sufficient heat to bring the charge to a temperature of 1200-1300° C. Further heating may then be necessary to maintain this temperature or increase it, if desired.

The temperature of the reaction is affected to some extent by the fineness of the reducing agent (magnesium or magnesium alloy) employed, since the heat evolved in a given time when reacting increases with increasing fineness.

For example, when manufacturing powders of particle size all below 2 microns, the temperature has to be kept below 1450° C. preferably using coarse magnesium powder retained on 100 mesh sieve (B. S. S.). At temperatures between 1600-1700° C., the particle size ranges between 0 and 5 microns. At temperatures of 1850° C. and above and using fine magnesium powder, the average particle size ranges from 7 to 20 microns. Thus by varying the temperature of reaction and using different size magnesium powders it is possible to control the particle size of the powder produced. This means of control of particle size is particularly valuable for the preparation of abrasive polishing powders, in which grain size has to be kept within very small limits, and also in the preparation of powders for subsequent sintering and hot-pressing operations, where uniformity and control of grain size is an important factor in the quality of the sintered material.

The heating can be carried out in any desired furnace, provided that the whole of the charge is brought up to the desired temperature. Preferably the reaction takes place in a non-oxidising atmosphere, i. e. an inert or reducing atmosphere, which is maintained also throughout the cooling stage. This ensures a high yield of boron carbide. The heating is preferably carried out in a tube furnace, such as a carbon tube furnace, where the charge is entered from one end and moves continuously through the furnace to the other end. Boats or charging tubes which will withstand the temperature are used as containers for the charge and the furnace is provided with a constant flow of burnt town gas, nitrogen or hydrogen.

The leaching treatment, which may be carried out with hot dilute hydrochloric sulphuric or nitric acid, removes metals, oxides and salts present in the boron carbide. After leaching, the product is filtered, washed and dried, for example by the use of a filter press.

The starting materials consisting of the boron containing material and the carbon, both in a finely divided state, may be mixed intimately and magnesium or magnesium alloys (in the form of thin turnings or powder) subsequently added.

The proportion of each material in the charge should be arranged so that the amount of boron containing material is in excess to the amount theoretically required, and the composition of the final product is governed and controlled by the ratio carbon/magnesium in the charge.

When the ratio magnesium/carbon is in the vicinity of 15 to 1, boron carbide is produced corresponding to the formula $B_4C$, but boron carbides of higher boron content may be obtained by increasing the ratio magnesium/carbon in the required proportion.

One example of the process of the invention is given below.

*Example*

A charge consisting of 50 parts by weight of anhydrous borax ($Na_2B_4O_7$, 20 parts by weight magnesium powder, and 1.2 parts by weight carbon, is placed in boats or charging tubes. These boats or tubes are continuously passed through a carbon tube furnace at a temperature of 1650-1700° C. The atmosphere in the furnace is maintained in a non-oxidising state by passing nitrogen or hydrogen through the furnace. After cooling, the product is leached with hot dilute hydrochloric and nitric acid, to produce approximately 6 parts by weight of boron carbide powder containing 77.5% boron and 21.3% carbon.

I claim:

1. A process for the production of boron carbide powders of desired particle size, including the steps of heating to a temperature within the range of 930° C. to 2000° C. a charge containing carbon, a material selected from the group consisting of boric oxide ($B_2O_3$), alkali metal tetraborate, and alkali earth metal tetraborate; and a reducing agent consisting essentially of metallic magnesium, and subsequently separating the boron carbide by a leaching treatment.

2. A process for the production of boron carbide powders, including the steps of heating to a temperature within the range of 930° C. to 2000° C., an intimate mixture of finely divided carbon, with a finely divided material selected from the group consisting of boric oxide ($B_2O_3$), alkali metal tetraborate, and alkali earth metal tetraborate, and a reducing agent consisting essentially of metallic magnesium, and subsequently separating the boron carbide by a leaching treatment.

3. A process for the production of boron carbide powders of desired particle size, including the steps of heating to a temperature within the range of 930° C. to 2000° C. in a tube furnace in a non-oxidising atmosphere a charge containing carbon, a material selected from the group consisting of boric oxide ($B_2O_3$), alkali metal tetraborate, and alkali earth metal tetraborate; and a reducing agent consisting essentially of metallic magnesium, and subsequently separating the boron carbide by a leaching treatment.

4. A process for the production of boron carbide powders, including the steps of heating to a temperature within the range of 930° C. to 2000° C. a charge containing carbon, a material selected from the group consisting of boric oxide ($B_2O_3$), alkali metal tetraborate, and alkali earth metal tetraborate, and a reducing agent consisting essentially of metallic magnesium, and subsequently separating the boron carbide by a leaching treatment, carried out with a hot dilute acid selected from the group consisting of hydrochloric acid, sulphuric acid and nitric acid.

5. A process for the production of boron carbide powders of desired particle size, including the steps of heating to a temperature within the range of 930° C. to 2000° C. a charge containing carbon, boric oxide ($B_2O_3$) and metallic magnesium and subsequently separating the produced boron carbide by leaching the oxidised compounds thereof out of the produced boron carbide.

6. A process for the production of boron carbide powders of desired particle size, including the steps of heating to a temperature within the range of 930° C. to 2000° C. a charge containing carbon, an anhydrous alkaline metal tetraborate and metallic magnesium, and subsequently separating the produced boron carbide by leaching the oxidised compounds thereof out of the produced boron carbide.

7. A process for the production of boron carbide powders of desired particle size, including thte steps of heating to a temperature within the range of 930° C. to 2000° C. a charge containing carbon, anhydrous sodium borate ($Na_2B_2O_7$) and metallic magnesium, and subsequently separating the produced boron carbide by leaching the oxidised compounds thereof out of the produced boron carbide.

8. A process for the formation of boron carbide powder consisting in charging a vessel with 50 parts by weight of anhydrous sodium borate ($Na_2B_2O_7$), 20 parts by weight of magnesium powder and 1.2 parts by weight of carbon; continuously passing said charged vessel through a carbon tube furnace at a temperature between 1650° C. and 1700° C., simultaneously passing a non-oxidising gas through said furnace; allowing the resulting product to cool and, thereafter, leaching said product with hot dilute hydrochloric and nitric acids.

9. A process for the production of boron carbide powders of desired particle size, including the steps of heating to a temperature within the range of 930° C. to 2000° C. a charge containing carbon, an anhydrous alkaline earth metal tetraborate and metallic magnesium, and subsequently separating the produced boron carbide by leaching the oxidised compounds thereof out of the produced boron carbide.

References Cited in the file of this patent

UNITED STATES PATENTS

| | | |
|---|---|---|
| 966,399 | Higgins | Aug. 2, 1910 |
| 1,473,510 | Parsons | Nov. 6, 1923 |
| 2,155,682 | Ridgway | Apr. 25, 1939 |

FOREIGN PATENTS

| | | |
|---|---|---|
| 408,354 | Germany | Jan. 16, 1925 |

OTHER REFERENCES

Babor et al.: "General College Chemistry," 2nd edition, 1940, pages 536–537.

Mellor: "Comprehensive Treatise on Inorganic and Theoretical Chemistry," 1924, vol. 5, page 137.